United States Patent
Hennessy et al.

(10) Patent No.: US 11,240,369 B2
(45) Date of Patent: *Feb. 1, 2022

(54) DEDICATED MOBILE DEVICE IN SUPPORT OF SECURE OPTICAL DATA EXCHANGE WITH STAND ALONE CERTIFICATE AUTHORITY

(71) Applicant: International Business Machines Corporation, Armonk, NY (US)

(72) Inventors: Shawn D. Hennessy, Lisbon, ME (US); Todd P. Seager, Orem, UT (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 398 days.

This patent is subject to a terminal disclaimer.

(21) Appl. No.: 16/297,624

(22) Filed: Mar. 9, 2019

(65) Prior Publication Data

US 2020/0288009 A1    Sep. 10, 2020

(51) Int. Cl.
*H04L 29/06* (2006.01)
*H04M 1/72463* (2021.01)
*G06F 21/74* (2013.01)
*G06F 21/84* (2013.01)

(52) U.S. Cl.
CPC ........ *H04M 1/72463* (2021.01); *G06F 21/74* (2013.01); *G06F 21/84* (2013.01)

(58) Field of Classification Search
CPC ..... H04M 1/72463; G06F 21/74; G06F 21/84
USPC .......................................................... 726/4
See application file for complete search history.

(56) References Cited

U.S. PATENT DOCUMENTS

| | | |
|---|---|---|
| 6,785,458 B2 | 8/2004 | Mule' |
| 7,535,605 B2 | 5/2009 | Cykana et al. |
| 7,556,203 B2 | 7/2009 | Robinson et al. |
| 8,061,606 B2 | 11/2011 | Barry |
| 8,135,624 B1 | 3/2012 | Ramalingam et al. |
| 8,781,446 B2 | 7/2014 | Lazaridis et al. |
| 8,811,363 B2 | 8/2014 | Velasco |
| 8,904,181 B1 | 12/2014 | Felsher et al. |

(Continued)

FOREIGN PATENT DOCUMENTS

| | | |
|---|---|---|
| CN | 206209748 U | 5/2017 |
| JP | 06223216 A | 8/1994 |

(Continued)

OTHER PUBLICATIONS

Rowan et al., "Securing Vehicle to Vehicle Communications Using Blockchain through Visible Light and Acoustic Side-Channels," Apr. 2017, 10 pages.

(Continued)

*Primary Examiner* — Evans Desrosiers
(74) *Attorney, Agent, or Firm* — VanLeeuwen & VanLeeuwen; Jeffrey S. LaBaw

(57) ABSTRACT

An approach is disclosed that optically transmit data from a dedicated mobile device (DMD) to another device. Optically transmitting the data is performed by displaying the data on a display screen included in the DMD. The approach further optically receives data at the DMD. The data is received at a digital camera included in the DMD. Based on the exchanged data, the DMD determines if the DMD and the other device are bound to each other.

17 Claims, 11 Drawing Sheets

(56) References Cited

U.S. PATENT DOCUMENTS

| | | | |
|---|---|---|---|
| 8,983,248 | B2 | 3/2015 | Sorin |
| 9,083,531 | B2 | 7/2015 | Chenna |
| 9,131,076 | B2 | 9/2015 | LeBeaux et al. |
| 9,135,430 | B2 | 9/2015 | Callaghan |
| 9,152,951 | B2 | 10/2015 | Okogun |
| 9,166,972 | B2 | 10/2015 | Maeda et al. |
| 9,537,854 | B2 | 1/2017 | Verma |
| 9,565,176 | B2 | 2/2017 | Goyal |
| 9,967,234 | B1 | 5/2018 | Crane |
| 10,536,846 | B1 | 1/2020 | Hennessy |
| 11,032,131 | B1 | 6/2021 | Franceschetti |
| 2002/0054416 | A1 | 5/2002 | Huang |
| 2005/0021705 | A1 | 1/2005 | Jurisch |
| 2005/0085188 | A1 | 4/2005 | Ishii |
| 2007/0164115 | A1 | 7/2007 | Joseph et al. |
| 2008/0230611 | A1 | 9/2008 | Sprague et al. |
| 2011/0261792 | A1* | 10/2011 | Oerton .............. H04M 1/724 370/335 |
| 2013/0016840 | A1 | 1/2013 | Willey et al. |
| 2015/0094024 | A1 | 4/2015 | Abiri |
| 2015/0097973 | A1* | 4/2015 | LeBeaux .............. H04B 10/00 348/207.1 |
| 2015/0365240 | A1 | 12/2015 | Callaghan et al. |
| 2016/0247115 | A1 | 8/2016 | Pons |
| 2016/0323736 | A1 | 11/2016 | Donahue et al. |
| 2016/0337127 | A1 | 11/2016 | Schultz et al. |
| 2016/0360403 | A1 | 12/2016 | Jordi et al. |
| 2017/0011208 | A1 | 1/2017 | Lynch |
| 2018/0181778 | A1 | 6/2018 | Lee |
| 2019/0354970 | A1 | 11/2019 | Di Iorio |

FOREIGN PATENT DOCUMENTS

| | | |
|---|---|---|
| JP | 11203392 A | 7/1999 |
| JP | 2010165335 A | 7/2010 |
| JP | 4992283 | 8/2012 |
| JP | 2016032247 A | 3/2016 |
| JP | 6051972 | 12/2016 |

OTHER PUBLICATIONS

"Brivo OnAir Information Security," Brivo, May 2016, 24 pages.

Anonymously, "A security mobile transaction method based on hardware crypto card and SIM card," IP.com No. IPCOM000248878D, Jan. 2017, 6 pages.

Anonymously, "Certified Equipment Device for Secure Software Deployment," IP.com No. IPCOM000245762D, Apr. 2016, 10 pages.

Anonymously, "Secure and flexible key distribution for industrial wireless devices," IP.com No. IPCOM000210378D, Aug. 2011, 6 pages.

"PKI Digital Signatures for Machine Readable Travel Documents," ICAO/TAG Technical Report, Apr. 2003, Passport Canada, 43 pages.

"Machine Readable Travel Documents," Technical Report, Secretary General, International Civil Aviation Organization, Oct. 2004, 57 pages.

Spencer, "Internet of Things market to hit $7.1 trillion by 2020: IDC," ZDNet, Jun. 2014, 7 pages.

Hennessy et al., "Optical Communication Mounting Frame in Support of Secure Optical Data Exchange With Stand Alone Certificate Authority," U.S. Appl. No. 16/297,622, filed Mar. 9, 2019, 49 pages.

Hennessy et al., "Secure Optical Data Exchange for Stand Alone Certificate Authority Device," U.S. Appl. No. 16/297,627, filed Mar. 9, 2019, 53 pages.

"List of IBM Patents or Patent Applications Treated as Related," Letter from Leslie A. Van Leeuwen, Mar. 10, 2019, 1 page.

* cited by examiner

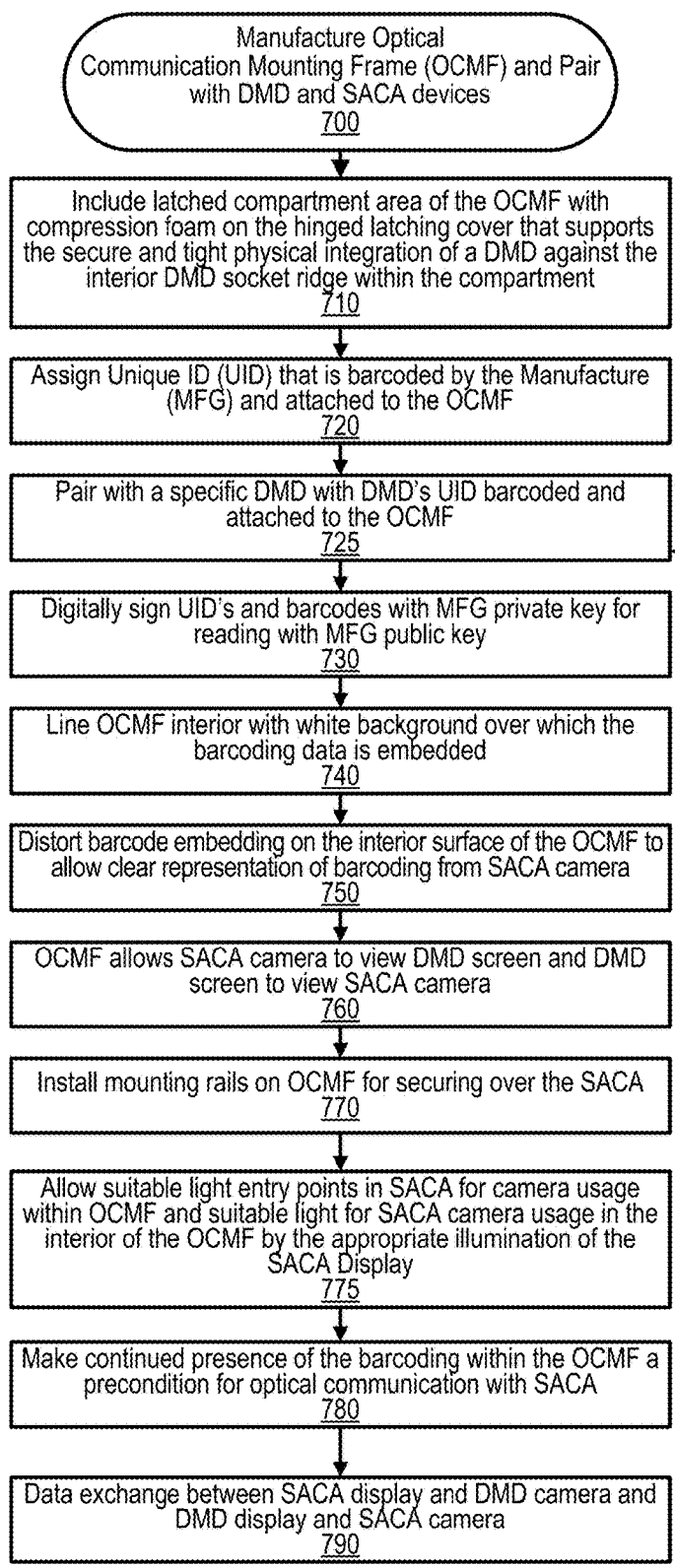
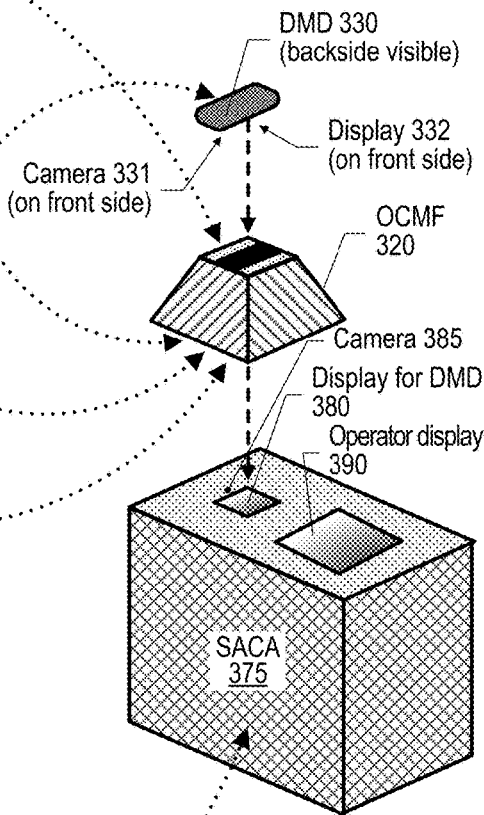
FIG. 7

DEDICATED MOBILE DEVICE IN SUPPORT OF SECURE OPTICAL DATA EXCHANGE WITH STAND ALONE CERTIFICATE AUTHORITY

BACKGROUND

Extended verbose communication from a physically isolated device using traditional approaches is static and open to receipt by any nearby optical device. Extended bi-directional communication from a Stand Alone Certificate Authority (SACA) device via current methods is difficult and susceptible to interception (i.e. theft of USB drive, etc.). Further, traditional approaches are unable to remotely audit security controls data while providing assurances of confidentiality, integrity and availability of critical systems. Traditional approaches cannot provide assurances that critical systems are secure, effectively managed, have not been compromised, and are not vulnerable for exploitation by outsiders. These shortcomings of traditional approaches impede successful management and security auditing of such critical systems.

SUMMARY

An approach is disclosed that optically transmit data from a dedicated mobile device (DMD) to another device. Optically transmitting the data is performed by displaying the data on a display screen included in the DMD. The approach further optically receives data at the DMD. The data is received at a digital camera included in the DMD. Based on the exchanged data, the DMD determines if the DMD and the other device are bound to each other.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 7 is a flowchart depicting steps taken to build a unique Optical Communication Mounting Frame (OCMF) for use with a Dedicated Mobile Device (DMD) when engaged with a critical system;

DETAILED DESCRIPTION

Figure 1:
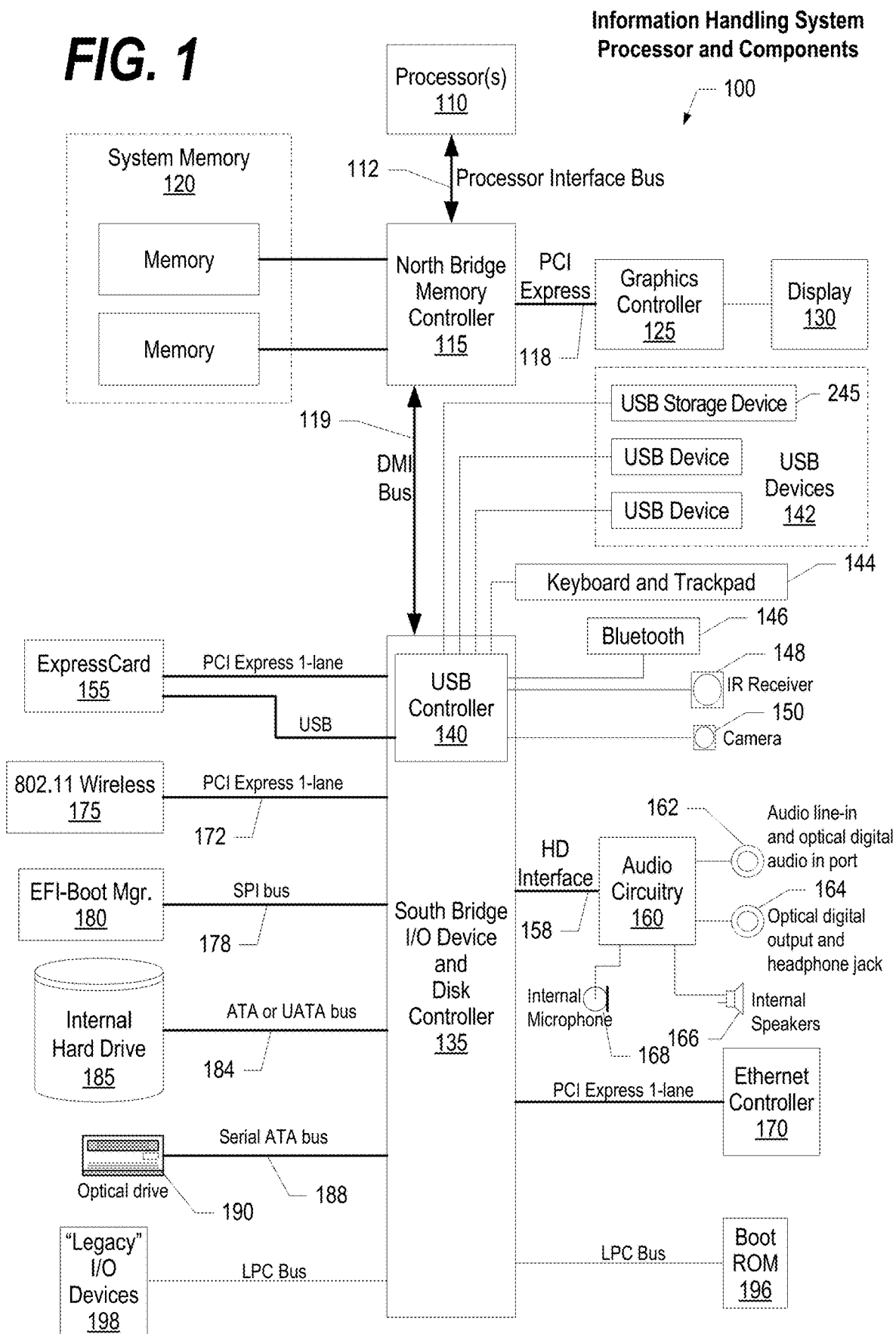
FIG. 1 is a block diagram of a data processing system in which the methods described herein can be implemented.

FIGS. 1-11 describe an approach that provides secure communication with a critical system. The approach includes an Optical Communications Mounting Frame (OCMF) to stabilize and secure the air gapped pathway for optical data communication between a Dedicated Mobile Device (DMD) and Stand Alone Certificate Authority (SACA) used in Authentication, Authorization, and Audit eco systems. The SACA is the critical system that communicates with the DMD.

In traditional systems, extended verbose communication from a physically isolated device via current methods is static and open to receipt by any present optical device. In the approach described herein, physical placement and maintaining continuous secure optical communication pathways uses physical stability for specific immediate proximity in bi-directional communication. The approach thwarts interception by third-party devices, supports specific air gap isolation, is bound to a specific DMD that is part of a SACA communication eco system, and supports a specific stable optical bi directional 'camera to display pathways' that is not currently available in traditional systems.

In one embodiment of the approach, the OCMF is a mounting frame device that enables support for continuous bidirectional optical communication between a SACA and a DMD. The OCMF provides both air gap security, physical stability of the communication pathways, and is logically bound to the DMD and the SACA devices through data within the approach that is consumed and processed by the SACA.

In one embodiment, the OCMF includes a latched compartment area with compression foam on the hinged latching cover that supports the secure and tight physical integration of a DMD against the interior DMD socket ridge within the compartment. In one embodiment, the OCMF includes a Unique ID (UID) that is barcoded by the Manufacture (MFG) and attached to the OCMF. In an embodiment, the OCMF is paired with a specific DMD by the MFG and has the DMD's UID barcoded and attached to the OCMF. In one embodiment, the manufacturer Certificate Authority (CA) digital signs the UIDs and barcodes the details for reading with its public key. In one embodiment, the interior on the OCMF is lined with a fully white background over which the barcoding data is embedded. In one embodiment, the embedding of the barcoding is distorted on the interior surface of the OCMF with the distortion of the barcoding allowing for clear representation of barcoding from the physical view of the SACA Camera.

In one embodiment, the continued presence of the barcoding within the OCMF is a precondition to optical communication between the DMD and the SACA. In one embodiment, the OCMF is designed to optimize and stabilize the data exchange along the optical pathways between the cameras and displays for both the SACA and the DMD. In one embodiment, the OCMF has mounting rails along three sides of the base for securing over the SACA. If a single SACA display is used, then in one embodiment, the OCMF does not cover all of the SACA display and allows for the GUI display and user interaction with the portion of the SACA display not covered by the OCMF. Light entry or exit from the interior of the OCMF when attached to the SACA is limited by the lining of the compression foam around the interior base of the OCMF and by the lining of compression foam around the interior DMD socket ridge.

As previously mentioned, the approach includes a Dedicated Mobile Device (DMD) that is logically bound to an OCMF and SACA. The DMD provides a secure data communications pathway between the SACA and the services provided by the manufacturer (MFG) of the SACA eco system. In one embodiment, the services provided are cloud-based Software as a Service (SaaS) that would include private data persistence.

In one embodiment, the DMD is contained within a tamper resistant enclosure with dimensions and physical keying features for alignment and use inside a matching OCMF. For example, cut outs on the enclosure are unique to the OCMF to which the DMD is paired so that only the assigned DMD will be able to fit into the OCMF like a puzzle piece. The tamper resistant enclosure provides for physical isolation to prevent operation of all inputs. In one embodiment, all buttons (e.g., home, volume, etc.) are inaccessible due to the enclosure with the only exposed interfaces being the touch screen and camera with the touch screen used to receive input from the user and also to display information to be received by the SACA's camera, and the DMD camera being used to receive data displayed on the SACA's display screen. In one embodiment, the DMD has a Unique ID (UID) that is created by the Manufacture (MFG). A crypto key pair is generated by the MFG and stored on the device with the private key being stored on secure memory of the DMD. A digital certificate with the DMD public key is created by the MFG Certificate Authority (CA) and is also stored on a secure memory of the DMD. The UID's of the DMD and the dedicated Optical Communication Mounting Frame (OCMF) and SACA are signed by the MFG CA and are additionally stored in the secure memory of the DMD. The public key of the SACA is also signed and stored on the DMD by the MFG.

The DMD is provisioned to only allow Cellular and Optical data communication with authorized entities. In one embodiment, the Cellular authorized entities are pre-determined phone numbers that are stored in the DMD's memory and are not alterable by a user of the DMD. In one embodiment, the DMD only allows for end user operation of a limited (e.g., single application, etc.) on the DMD device. In this embodiment, a DMD application is programmed for reception and display of secure Optical Data Communication with a dedicated SACA. To reduce the risk of compromise or hacking by unauthorized users to either the DMD or the assigned SACA, in one embodiment, the DMD does not allow for any external I/O operations (e.g., no WiFi, etc.) other than allowing operation of user inputs to the face of the DMD touch screen or via Optical Data Communications (e.g., camera capturing information displayed by the assigned SACA, DMD display displaying information to the SACA that is captured by the SACA's camera, etc.).

Should the DMD be extracted from the enclosure, the DMD is provisioned to lock down operations in order to prevent any I/O at the device from becoming operational. In the embodiment utilizing the security enclosure, the charging port of the DMD may be inaccessible with the battery-powered DMD charged by inductive charging. In one embodiment, the enclosure in which the DMD is placed is also an inductive charger so that the DMD may be inductively charged by providing power to the enclosure which, in turn, inductively charges the DMD. In a further embodiment, the DMD is always on and transmits a "heart beat" at rate determined by the MFG. This heartbeat can include GPS information of the DMD that can be transmitted, via Cellular communications, to a pre-assigned phone number corresponding to a system that tracks the DMD's usage and health. In a further embodiment, the DMD defaults into a power saving mode during time of non-operations or non-movement.

In one embodiment, the DMD is provisioned by the manufacturer with an alpha-numeric password for the logical unlocking of the device and this password is provided to user at time of receipt. In one embodiment, the limited applications accessible from the DMD include an application that allows the user to change the password with the application ensuring that the password is of suitable strength. Finally, in one embodiment, the DMD is embedded with Remote Device Management (RDM) software that is administered by the manufacturer that allows the manufacturer to update the DMD firmware and software remotely using a pre-assigned phone number that the DMD is configured to accept as a valid phone number with additional safeguards (e.g., passwords, etc.) to ensure that a malevolent user is not attempting to access the DMD using a spoofed telephone number.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
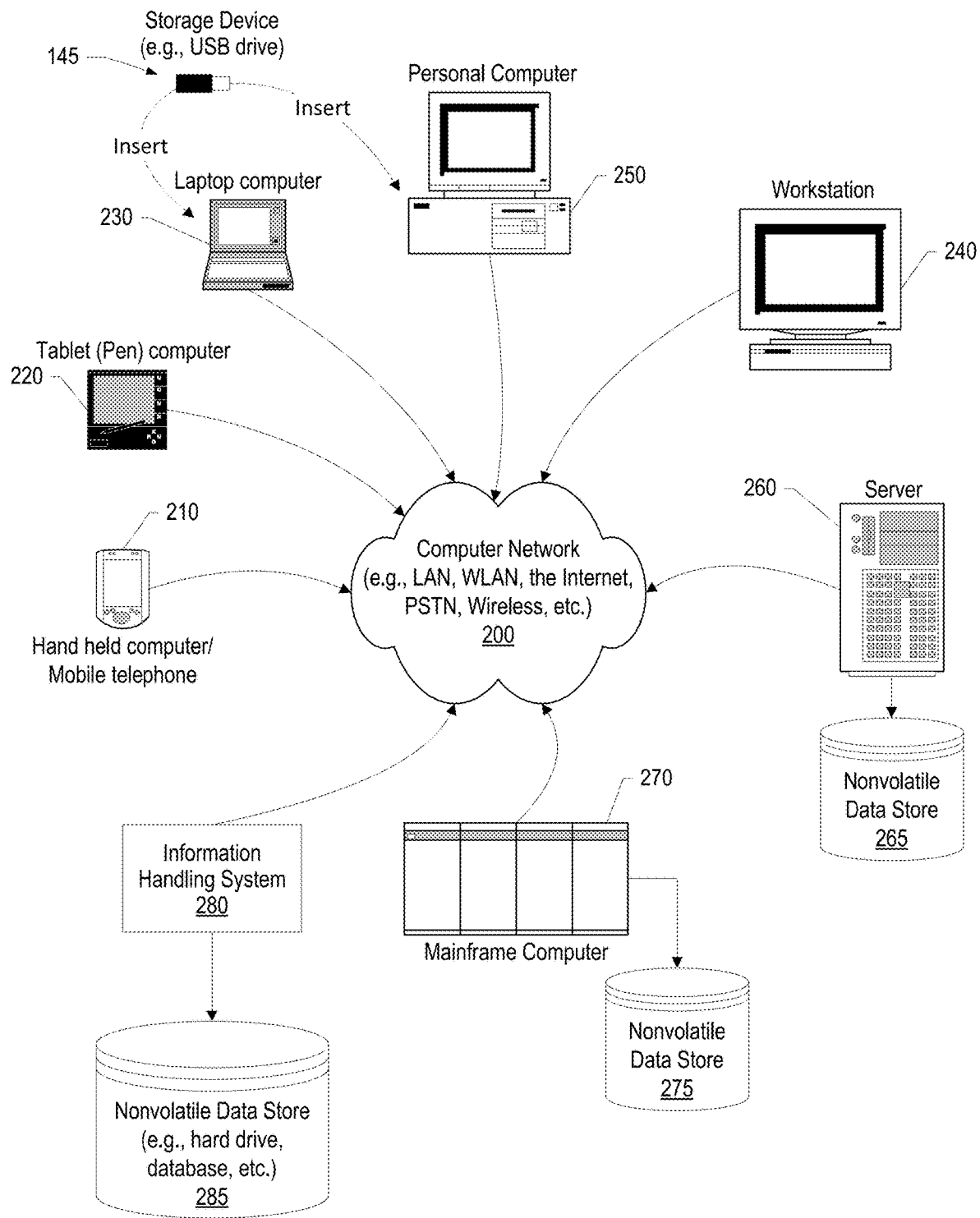
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) and the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wirelessly communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer networks that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
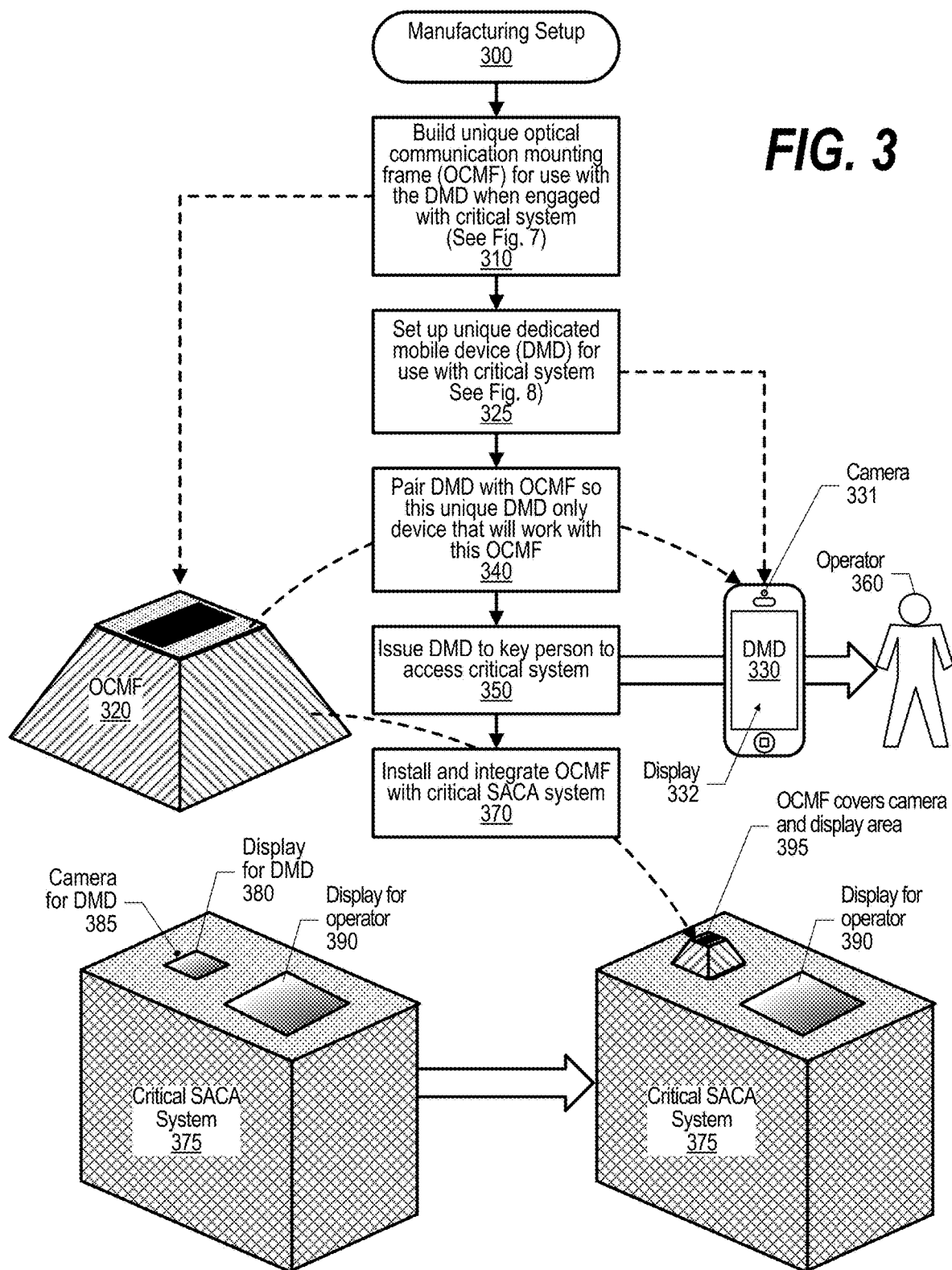
FIG. 3 is a flowchart and component diagram depicting an approach that manufactures components bound to one another to provide a secure interface to a critical system.

FIG. 3 is a flowchart and component diagram depicting an approach that manufactures components bound to one another to provide a secure interface to a critical system. FIG. 3 processing commences at 300 and shows the steps taken by a manufacturing process that sets up the various components. At step 310, the process builds a unique optical communication mounting frame (OCMF 320) for use with a particular dedicated mobile device (DMD 330) when engaged with critical system, such as Stand Alone Certificate Authority (SACA 375). See FIG. 7 and corresponding text that shows the details of building OCMF 320.

At step 325, the process sets up unique DMD 330 for use with critical system. See FIG. 8 and corresponding text that shows the details of building DMD 330. After set up, the DMD is assigned to operator 360 and the operator is provided with usage instructions and any codes (e.g., passwords, etc.) needed to operate DMD 330. As shown, DMD 330 includes camera 331 that is used to capture data displayed on display 380 included in SACA system 375. In one embodiment, display 380 is a dedicated display used to display information to the DMD, while in another embodiment, a portion of a display, such as operator display 390, is used to display information to the DMD. DMD 330 also includes display 332 that is used to display information that is captured by camera 385 that is included in SACA system 375. OCMF 320 is placed over the display (either display 380 or 390) and DMD 330 is placed face down on the opening in the top of OCMF with the opening in OCMF being large enough to allow for display 332 to be visible from SACA camera 385 and also large enough to allow DMD camera 331 to view the SACA display through the OCMF. The OCMF is an apparatus with sides and, in one embodiment, information coded on the sides of the OCMF is captured by the respective cameras (camera 331 and camera 385) to ensure that OCMF 320 is in place before communication is allowed between DMD 330 and critical SACA system 375. A depiction of OCMF 320 covering display 380 of SACA system 375 is shown at 395.

At step 340, the process pairs DMD 330 with OCMF 320 so this unique DMD is the only device that will communicate with this OCMF using the optical communications described herein. In one embodiment, OCMF 320 is coded with information read by camera 331 with DMD 330 inhibiting communication operations with SACA 375 if the assigned OCMF is not present. The coded information is printed on the inside of OCMF and might be distorted based on the shape of the OCMF and also might be encrypted so that only assigned devices (e.g., DMD 330, SACA 375, etc.) can read and decrypt the coded data.

At step 350, the process issues configured DMD 330 to key person (operator 360) to access critical system using the assigned DMD and the assigned OCMF. At step 370, the process installs and integrates the OCMF with critical SACA system 375. As previously mentioned, OCMF 320 is encoded with information printed on the sides of the unit that are read by SACA camera 385 and, in one embodiment, SACA 375 inhibits any communication with any devices if the assigned OCMF is not present. As previously mentioned, the coded information may be printed in a distorted fashion based on the shape of OCMF and also might be encrypted so that only devices, such as SACA 375, assigned to the particular OCMF can read and decrypt such coded information.

Figure 4:
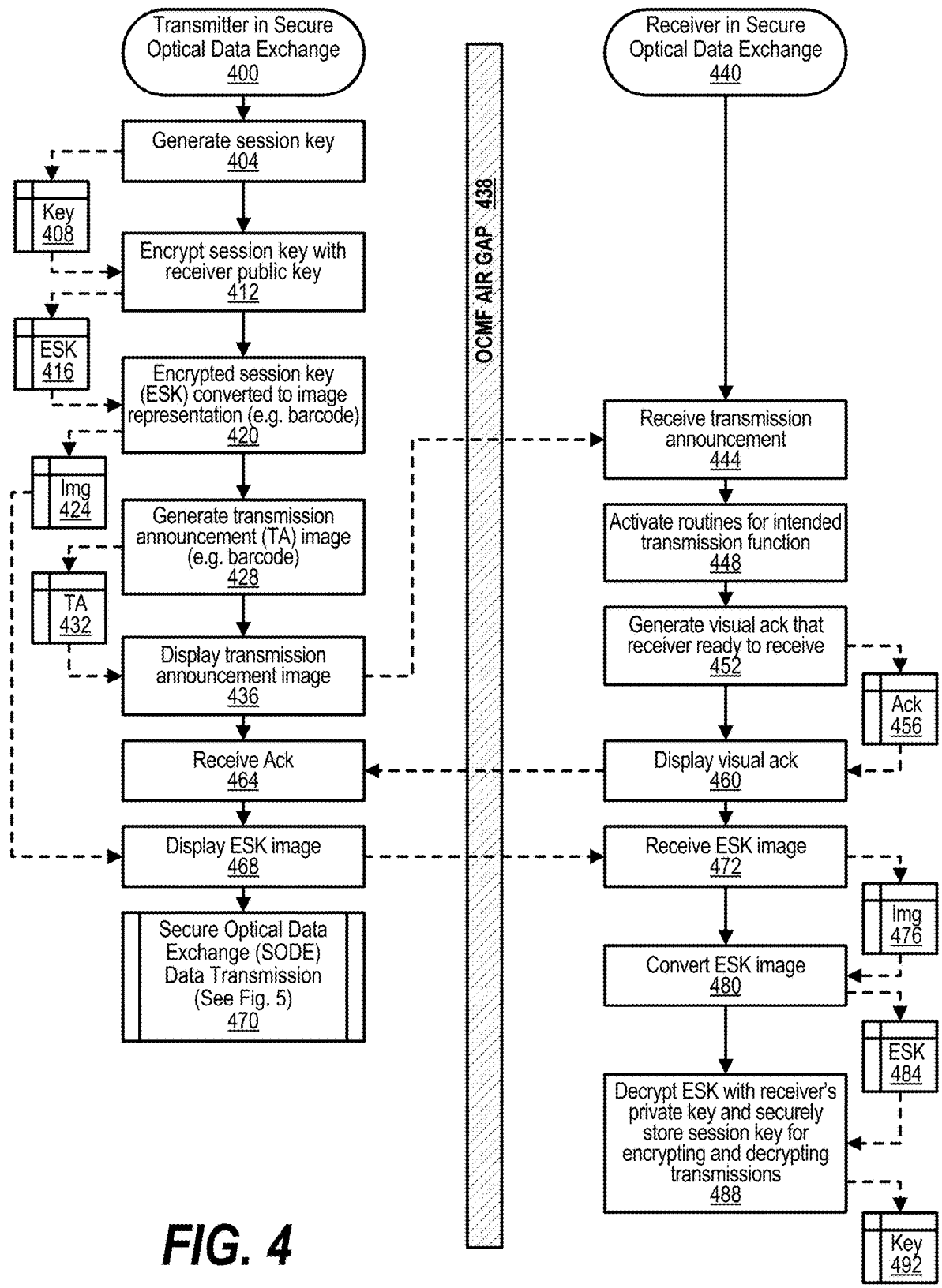
FIG. 4 is a flowchart depicting the transmission and reception of data in a secure optical data exchange environment.

FIG. 4 is a flowchart depicting the transmission and reception of data in a secure optical data exchange environment. FIG. 4 processing commences at 400 and shows the steps taken by a process performed by the transmitter in a Secure Optical Data Exchange. At step 404, the transmitter process generates session key that is stored in memory area 408. At step 412, the transmitter process encrypts session key with receiver public key and the encrypted session key is stored in memory area 416. At step 420, the transmitter process converts the encrypted session key (ESK) to an image representation, such as a barcode, etc. with the image stored in memory area 424. At step 428, the transmitter process generates a transmission announcement (TA) image, such as a barcode, with the transmission announcement images being displayed at step 436 on the display screen so that it can be captured (received) by the receiver's digital camera.

Receiver processing commences at 440 and shows the steps taken by a process performed by the receiver in the Secure Optical Data Exchange. At step 444, the receiver process receives the transmission announcement image over the Optical Communication Mounting Frame (OCMF) air gap 438 by the receiver's digital camera. The OCMF air gap is the air space between the dedicated mobile device (DMD) and the stand alone certificate authority (SACA) critical system (see FIG. 3, elements 320, 330, and 375 for depictions of these devices).

At step 448, the receiver process activates one or more routines needed for the intended transmission function based on the received transmission announcement. At step 452, the receiver process generates a visual acknowledgement image indicating that the receiver is ready to receive data from the transmitter. The visual acknowledgement image is stored in memory area 456 and displayed on the receiver's display device at step 460 so that it can be received by the transmitter's digital camera.

At step 464, the transmitter process receives the acknowledgment at the transmitter's digital camera. At step 468, the transmitter process displays the encrypted session key (ESK) image that is retrieved from memory area 424 and displayed on the transmitter's display for reception by the receiver's digital camera. At predefined process 470, the transmitter process performs the Secure Optical Data Exchange (SODE) Data Transmission routine to visually transmit data to the receiver over OCMF air gap 438 (see FIG. 4 and corresponding text for processing details). Inhibiting non-visual electronic communication between the transmitter and receiver prevents malevolent bystanders from being able to electronically snoop and receive the contents on the data that is being transmitted.

At step 472, the receiver process receives the encrypted session key (ESK) image displayed by the transmitter process with the receiver process receiving the ESK image using the receiver's digital camera. The received ESK image is stored in memory area 476. At step 480, the receiver process converts the received ESK image to the actual encrypted session key (ESK) that is stored in memory area 484. At step 488, the receiver process decrypts the encrypted session key (ESK) using the receiver's private key as the ESK was encrypted using the receiver's public key. The decrypted session key is securely stored for encrypting and decrypting transmissions between the receiver and transmitter.

Figure 5:
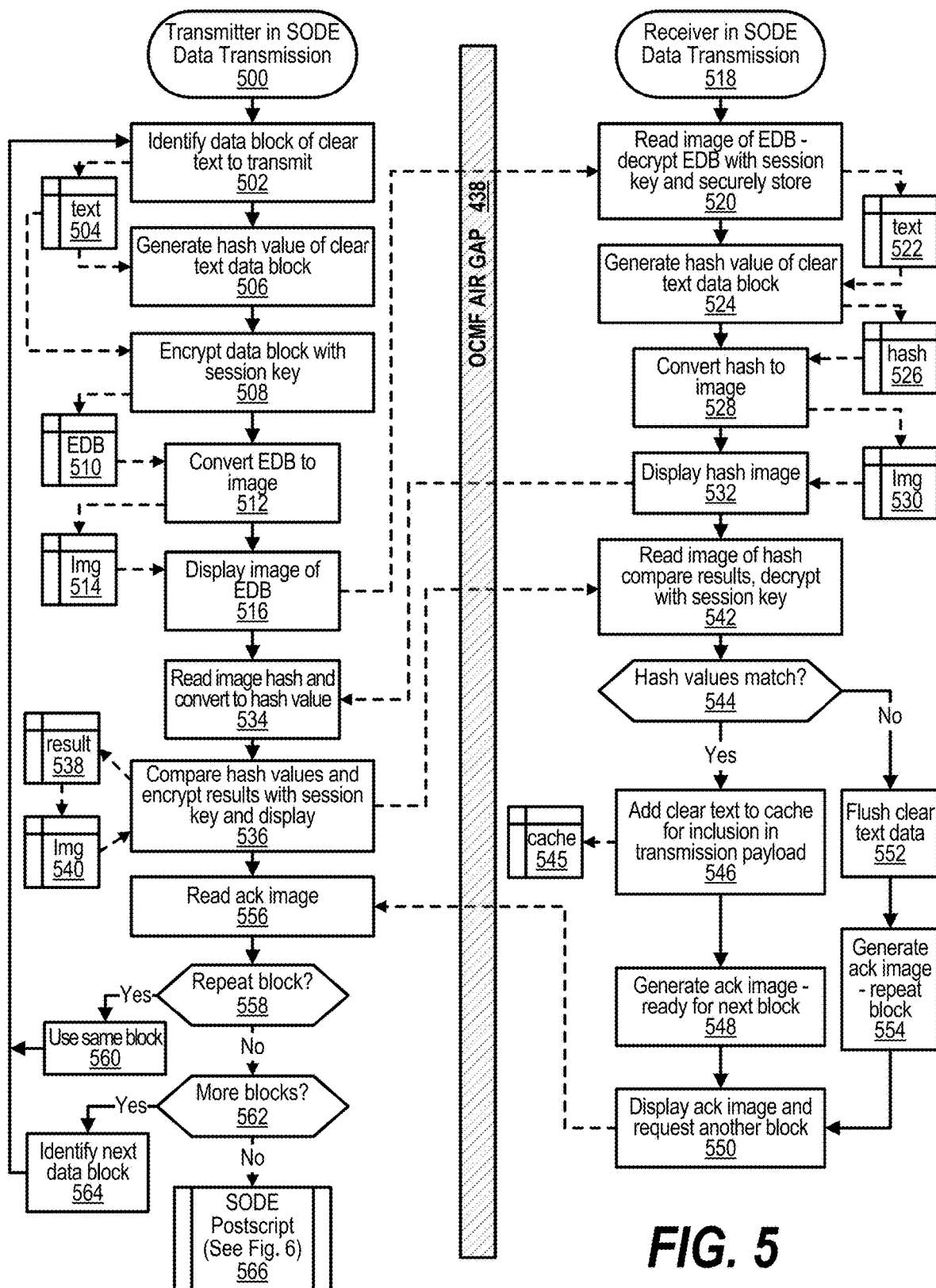
FIG. 5 is a flowchart depicting the Secure Optical Data Exchange (SODE) data transmission.

FIG. 5 is a flowchart depicting the Secure Optical Data Exchange (SODE) data transmission. FIG. 5 processing commences at 500 and shows the steps taken by a process performed by a transmitter in a SODE Data Transmission. At step 502, the transmitter process identifies a data block of clear text to transmit to the receiver. This text is stored in memory area 504. At step 506, the transmitter process generates a hash value of the clear text data block. At step 508, the transmitter process encrypts the data block using the session key and the encrypted data block (EDB) is stored in memory area 510. At step 512, the transmitter process converts the EDB to an image that is stored in memory area 514. This image is displayed on the transmitter's display at step 516 so that it can be captured by the receiver's digital camera and processed.

Receiver processing commences at 518 and shows the steps taken by a process performed by the receiver in the SODE Data Transmission. At step 520, the receiver process reads the image of the EDB, converts the image to text, decrypts the EDB with the session key, and securely stores the decrypted data in memory area 522. At step 524, the receiver process generates a hash value of the clear text data block and the hash value is stored in memory area 526. At step 528, the receiver process converts the hash value to an image representation that is stored in memory area 530. At step 532, the receiver process displays the hash image representation so that it can be captured by the transmitter's digital camera.

At step 534, the transmitter process reads the hash image representation and converts it to a hash value. At step 536, the transmitter process compares the hash value received from the receiver with the hash value computed by the transmitter at step 506 and encrypts the result of the comparison with the session key and displays an image representation on the display screen which is captured by the receiver's digital camera.

At step 542, the receiver process reads the image of the hash comparison results and decrypts the comparison results with the session key. The receiver process determines as to whether hash values match (decision 544). If the hash values match, then decision 544 branches to the 'yes' branch to perform steps 546 through 550. On the other hand, if the hash values do not match, then decision 544 branches to the 'no' branch to perform steps 552 and 554. If the hash value match then, at step 546, the receiver process adds the clear text to cache 545 for inclusion in the transmission payload. At step 548, the receiver process generates an acknowledgement image signifying that the receiver is ready to receive the next data block as described above and this acknowledgement image is displayed to the transmitter at step 550. If the hash values do not match then, at step 552, the receiver process flushes the clear text data and, at step 554, the receiver process generates an acknowledgement image signifying that the receiver failed to successfully receive the data block and that it needs to be resent to the receiver with step 550 being performed to display this acknowledgement image to the transmitter.

At step 556, the transmitter process reads the acknowledgement image displayed on the receivers display device using the transmitter's digital camera. The transmitter process determines as to whether the acknowledgement requested to repeat the block or requested a new block (decision 558). If the acknowledgement is to repeat the same data block, then decision 558 branches to the 'yes' branch whereupon at step 560 the transmitter uses the same data block and returns to step 502 to repeat the steps taken to transmit the data block. On the other hand, if the acknowledgement does not request a repeat transmission of the data block, then decision 558 branches to the 'no' branch for further processing. The transmitter process determines as to whether there are more data blocks to transmit to the receiver (decision 562). If there are more blocks, then decision 562 branches to the 'yes' branch whereupon, at step 564, the process identifies the next data block to be transmitted and processing returns to step 502 to transmit this data block to the receiver. This looping continues until there are no more data blocks to transmit to the receiver, at which point decision 562 branches to the 'no' branch whereupon, at predefined process 566, the transmitter process performs the SODE Postscript routine (see FIG. 5 and corresponding text for processing details).

Figure 6:
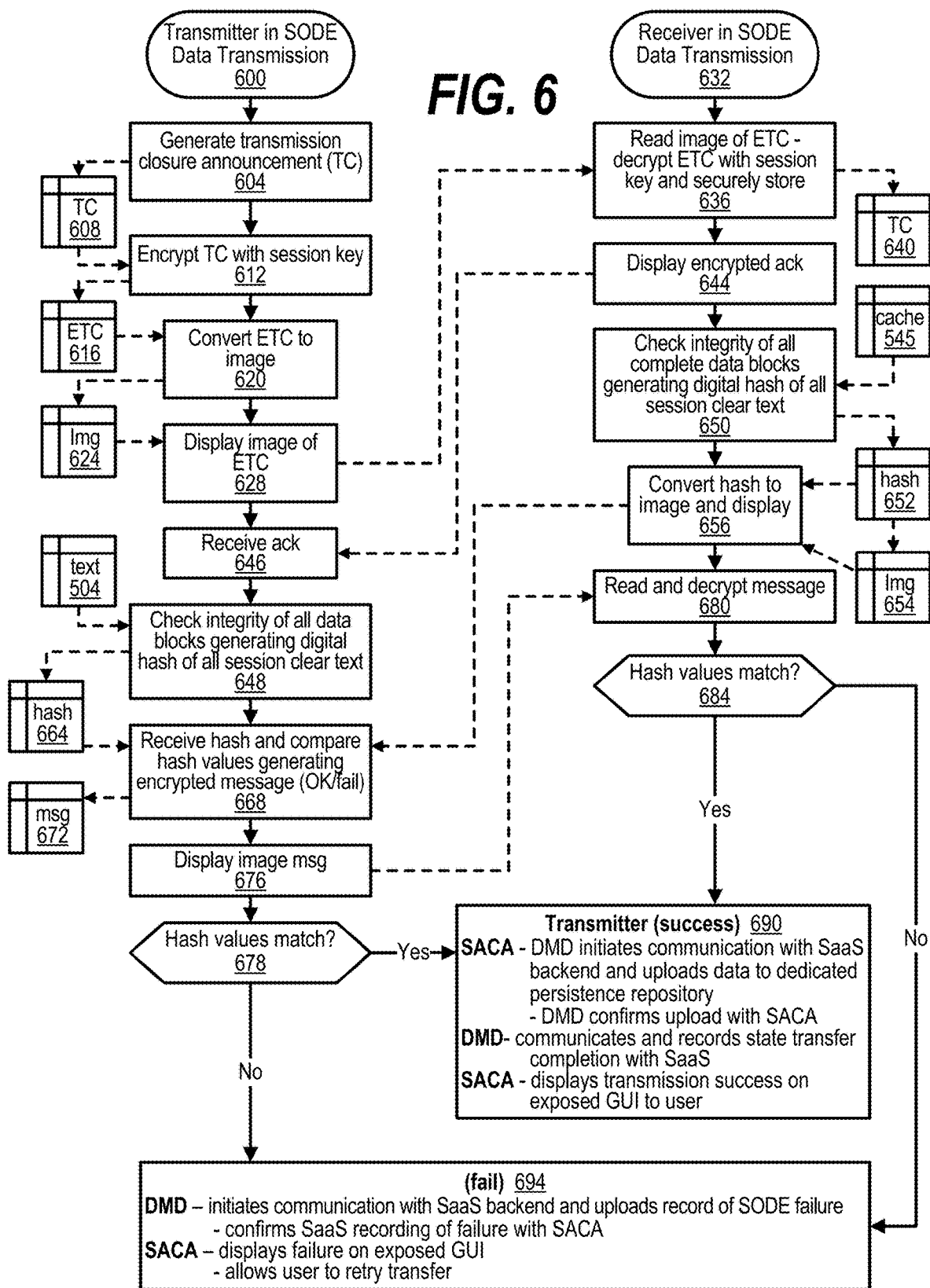
FIG. 6 is a flowchart depicting Secure Optical Data Exchange (SODE) postscript processing.

FIG. 6 is a flowchart depicting Secure Optical Data Exchange (SODE) postscript processing. FIG. 6 processing commences at 600 and shows the steps taken by a process performed by a transmitter in SODE Data Transmission during postscript processing. At step 604, the transmitter process generates transmission closure announcement (TC) that is stored in memory area 608. At step 612, the transmitter process encrypts the TC with the session key resulting in encrypted TC (ETC) that is stored in memory area 616. At step 620, the transmitter process converts the ETC to an image representation that is stored in memory area 624 and displayed on the display device at step 628.

Receiver processing commences at 632 and shows the steps taken by a process performed by the receiver in SODE Data Transmission during postscript processing. At step 636, the receiver process uses the receiver's digital camera and reads the image of the ETC displayed by the transmitter. The receiver decrypts the ETC with the session key and securely stores the TC in memory area 640. At step 644, the receiver process displays an encrypted acknowledgement back to the transmitter.

At step 646, the transmitter process receives the acknowledgement from the receiver and, at step 648, the transmitter process checks the integrity of all data blocks and generates a digital hash of all of the session clear text. The text is received from memory area 504 and the hash is stored in memory area 664.

At step 650, the receiver process checks the integrity of all complete data blocks generating a digital hash of all session clear text. The data block data is retrieved from cache 545 and the hash is stored in memory area 652. At step 656, the receiver process converts the hash from memory area 652 to an image representation that is stored in memory area 654 and displays the image on the receiver's display device so that it can be read by the transmitter's digital camera.

At step 668, the transmitter process receives the hash from the receiver and stores it in memory area 672 and compares the hash value to the hash value stored in memory area 664 with the comparison resulting in a generated message indicating whether the hash values match (e.g., success, fail, etc.). At step 676, the transmitter process displays an image on the display device indicating to the receiver process whether the hash values matched.

At step 680, the receiver process reads and decrypts messages displayed by the transmitter. The receiver process determines whether the hash values match based on the image received from the transmitter (decision 684). If the hash values match, then decision 684 branches to the 'yes' branch to perform steps taken during transmission success. On the other hand, if the hash values do not match, then decision 684 branches to the 'no' branch to perform steps taken during transmission failure.

The transmitter process also determines whether the hash values match (decision 678). If the hash values match, then decision 678 branches to the 'yes' branch to perform steps taken during transmission success. On the other hand, if the hash values do not match, then decision 678 branches to the 'no' branch to perform steps taken during transmission failure.

When transmission is successful then, at step 690, the following steps are performed at the various devices. At the secured system (SACA, etc.), the DMD initiates communication with a SaaS backend system and uploads data to a dedicated persistence repository and the DMD confirms the upload with the SACA. At the DMD, the DMD communicates and records state transfer completion with the SaaS backend system. Finally, at the SACA, the secured system displays transmission success on an exposed GUI displayed on a display to the user.

On the other hand, when the hash values do not match indicating a failed transmission then, at step 694 the following steps are performed at the various devices. At the DMD, the DMD initiates communication with the SaaS backend system and uploads a record of the SODE failure to the backend system. The DMD further confirms the SaaS recording of failure with the SACA system. The secured system (SACA) displays a failure message on an exposed GUI displayed on a display to the user and further allows the user to retry transferring the data to the backend system.

FIG. 7 is a flowchart depicting steps taken to build a unique Optical Communication Mounting Frame (OCMF) for use with a Dedicated Mobile Device (DMD) when engaged with a critical system. FIG. 7 processing commences at 700 and shows the steps taken by a manufacturing process that manufactures the Optical Communication Mounting Frame (OCMF) and pairs the OCMF with a dedicated mobile device (DMD) and a secure system (Stand Alone Certificate Authority, or "SACA") device.

At step 710, the manufacturing process installs a latched compartment area on OCMF 320 with a compression foam on the hinged latching cover that supports the secure and tight physical integration of DMD 330 against the interior DMD socket ridge within the compartment. At step 720, the manufacturing process assigns a unique identifier (UID) that is barcoded by the Manufacture (MFG) and attached to the OCMF, such as being inscribed on the interior surface of the OCMF. At step 725, the manufacturing process pairs OCMF 320 with a specific DMD 330 with the DMD's UID barcoded and attached to the OCMF, such as being encoded on the interior surface of the OCMF where it can be read by both the DMD's digital camera 331 as well as by digital camera 385 included in SACA device 375.

At step 730, the manufacturing process digitally signs the UIDs and the barcodes with the MFG private key for reading by encrypting with the MFG public key. At step 740, the manufacturing process lines the interior of OCMF 320 with white background over which the barcoding data is embedded. In one embodiment, at step 750, the manufacturing process distorts barcode embedding on the interior surface of the OCMF to allow clear representation of barcoding from SACA camera. At step 760, the manufacturing process performed on the OCMF allows the SACA camera 385 to view DMD screen 332 and DMD camera 331 to view SACA display 380 with the OCMF being a somewhat hollow frame through which the cameras can view the respective displays screens.

At step 770, the manufacturing process installs mounting rails on the OCMF for securing over the surface of SACA 375. At step 775, the manufacturing process allows suitable light entry points in SACA 375 to provide enough light for digital camera usage within the OCMF. Also, at step 775, this embodiment should allow for the suitable light for SACA camera usage in the interior of the OCMF by the appropriate illumination of the SACA Display. At step 780, the manufacturing process makes continued presence of the barcoding within the OCMF a precondition for optical communication with SACA 375. In this embodiment, if the OCMF is not present then software installed in the OCMF inhibits communication between the DMD and the OCMF using the respective digital cameras and display screens. At step 790, the manufacturing process performs a data exchange between the SACA display and the assigned DMD camera and the DMD display and the SACA camera.

Figure 8:
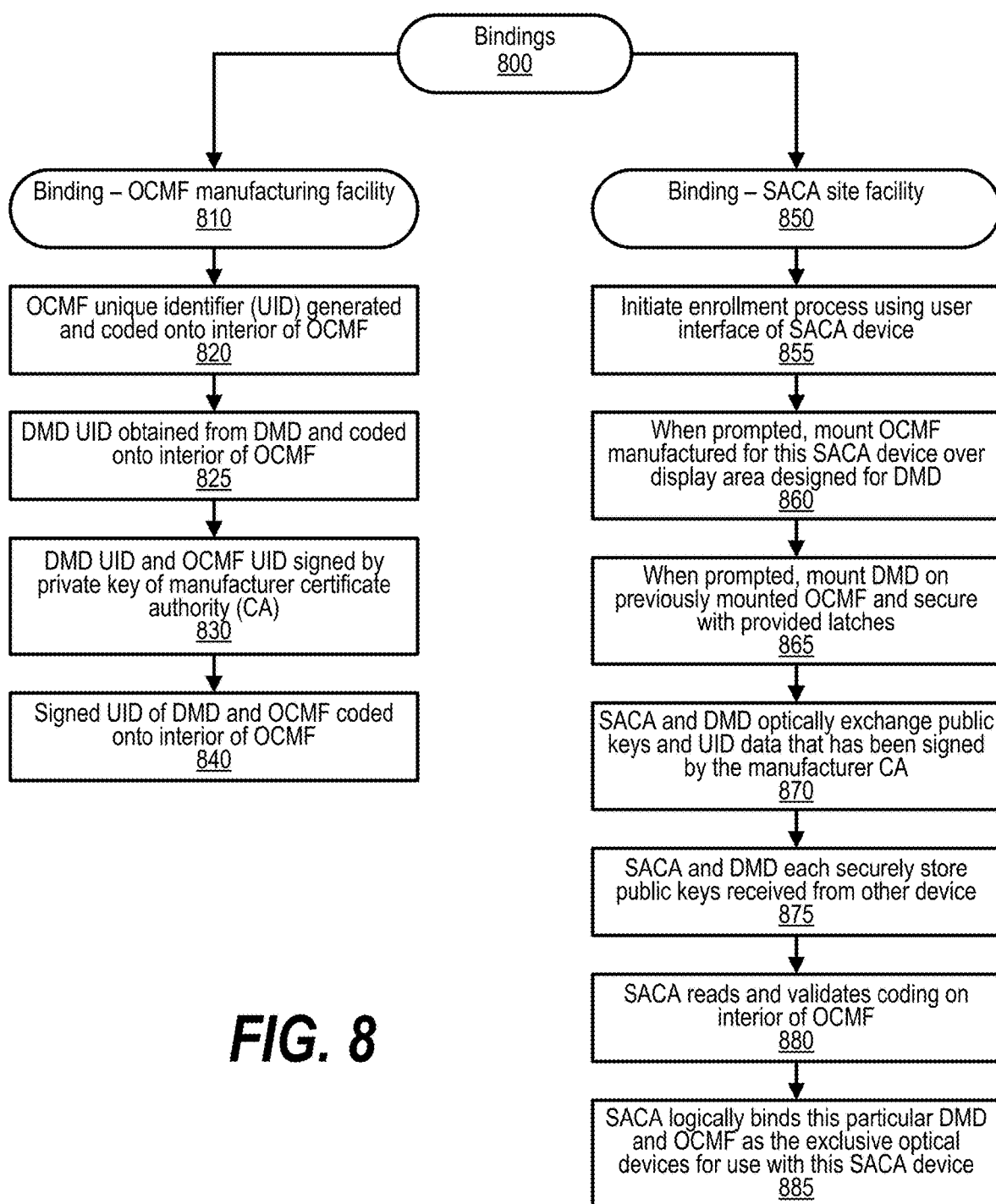
FIG. 8 is a flowchart depicting steps taken to bind the components utilized to interface with a critical system during manufacturing and installation.

FIG. 8 is a flowchart depicting steps taken to bind the components utilized to interface with a critical system during manufacturing and installation. FIG. 8 processing commences at 800 and shows the steps taken by a process that binds the various components to one another. The steps are shown being divided between steps performed at the manufacturing facility before arriving on site (starting at 810) and steps performed at the facility where the secure SACA system is operating (starting at step 850). These steps do not necessarily have to be performed at the shown locations with these steps and locations simply being one possible embodiment.

At step 820, the process generates the OCMFs unique identifier (UID) and this identifier is coded onto the interior surface of the OCMF. At step 825, the process obtains the DMD's UID from the DMD and codes this UID onto the interior surface of the OCMF. At step 830, the process signs the DMD's UID and the OCMF's UID using a private key of the manufacturer certificate authority (CA). At step 840, the process codes the signed UID of both the DMD and the OCMF onto the interior surface of the OCMF.

Steps 855 through 885 are shown as being performed at the secured (SACA) device facility, such as at the time of installation of the SACA or integration of the OCMF and DMD with an installed SACA device. At step 855, the process initiates an enrollment process at the SACA device using a user interface provided at the SACA device. This enrollment process binds the unique assigned OCMF and the unique assigned DMD to this particular SACA device.

At step 860, the process has a user or technician mount (when prompted), the OCMF that was manufactured specifically for this SACA device. The OCMF is mounted over a display area on the SACA device that is designed for communication with the DMD. At step 865, the process prompts the user to mount the assigned DMD on the OCMF that was mounted in step 860 and has the user secure the DMD to the OCMF with latches provided on the OCMF. At step 870, the process initiates the SACA and DMD to optically exchange public keys using the respective display screens and digital cameras as well as exchanging UID data that has been signed by the manufacturer CA.

At step 875, the process performed by the SACA and DMD has each device securely store the received public keys received from the other device. At step 880, the process has the SACA device read and validate the coding from the interior of OCMF with validation performed using the UIDs and keys previously received by the SACA device. At step 885, the process performed on the SACA logically binds this particular assigned DMD and the particular assigned OCMF as the exclusive optical devices for use with this SACA device. In one embodiment, the SACA inhibits communication through the SACA's display screen and digital camera if the assigned DMD and OCMF are not present.

As described above, binding can include various types of binding between the various components. Components are logically bound to one another via data, such as the exchanged keys and exchanged user identifiers that identify a bound component to another component. Components are further cryptographically bound to one another by having such data encrypted with keys known to another of the bound components. For example, a UID encrypted with one component's private key can be decrypted by another component by using the corresponding public key thus providing a level of confidence that the data has not been spoofed by an imposter. Finally, the components are physically bound to each other in various ways. One way, as described with regard to other figures, is a unique physical shape on an exterior of one component that matches, or fits into, a corresponding unique physical shape found on another component. Moreover, one physical component, such as the DMD, is physically matched to another component, such as the SACA and the OCMF, during a manufacturing process.

Figure 9:
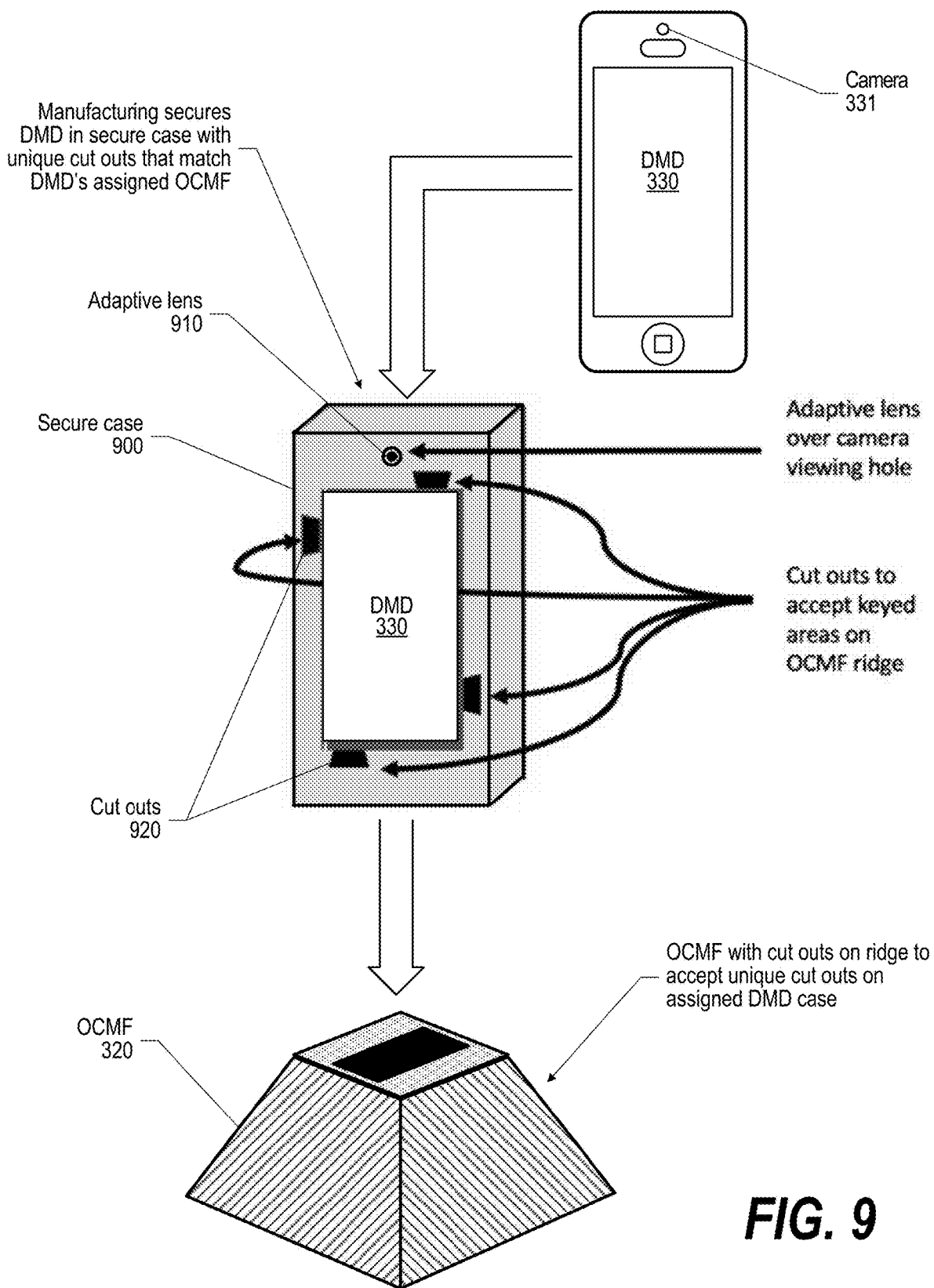
FIG. 9 is a component diagram depicting usage of a Dedicated Mobile Device (DMD) security enclosure.

FIG. 9 is a component diagram depicting usage of a Dedicated Mobile Device (DMD) security enclosure. DMD 330 is the electronic device that communicates with a secure system (SACA) utilizing the display screen and digital cameras included in the DMD and SACA device. To prevent DMD from malevolent tampering, hacking, or "jail-breaking," DMD 330 is optionally secured in secure case 900 during manufacturing or shortly thereafter.

Figure 10:
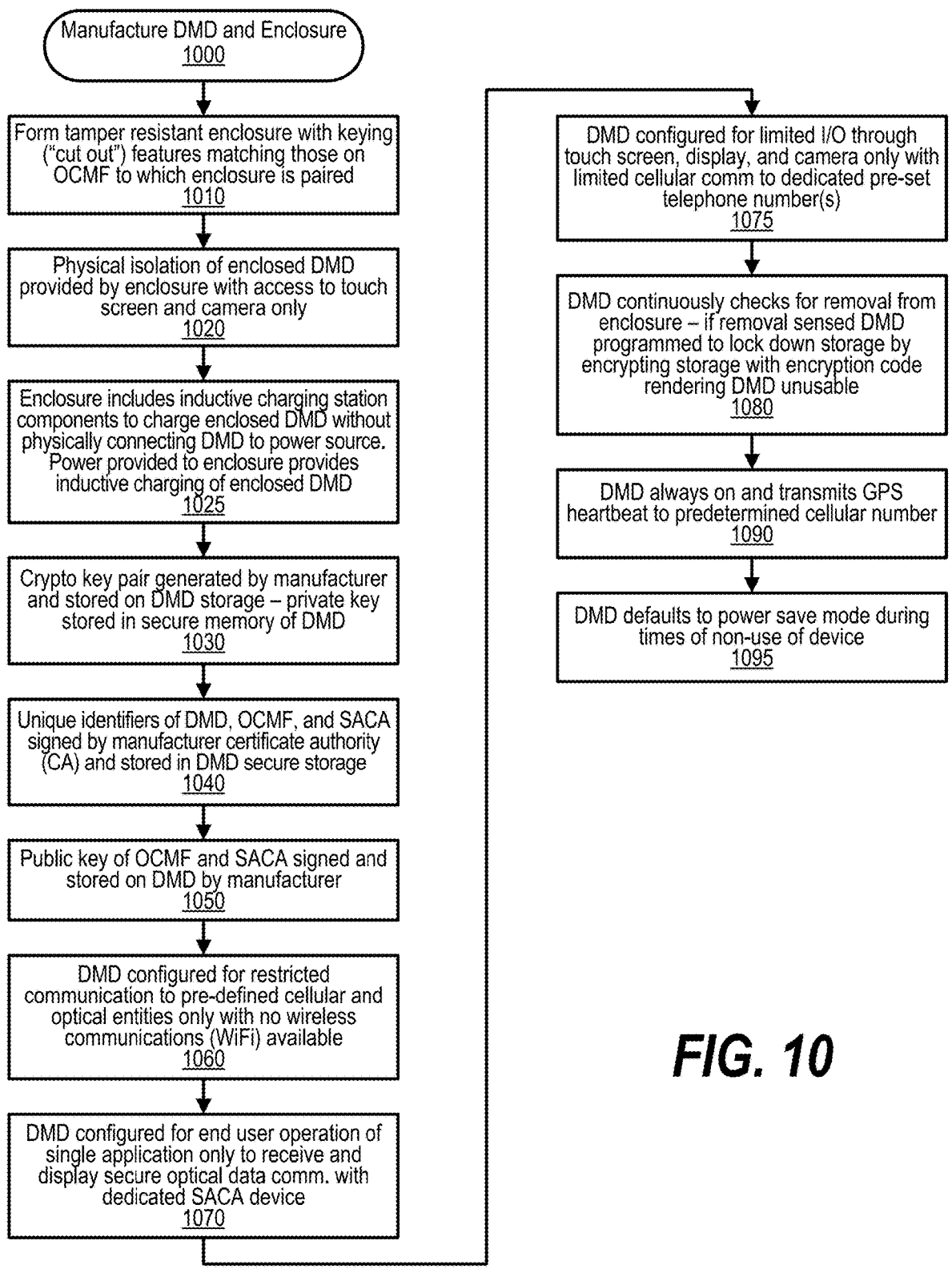
FIG. 10 is a flowchart depicting steps to manufacture a Dedicated Mobile Device (DMD) enclosed in a security enclosure, bind the components, and use the DMD with a critical system.

Secure case 900 includes adaptive lens 910 that aligns with digital camera aperture 331 of DMD 330. In addition, secure case 900 includes cut outs in the surface of the face of the secure case so that such cut outs align with corresponding features found on the surface of OCMF 320 so that the secure case fits like a puzzle piece on top of OCMF 320. In one embodiment, each secure case has a unique pattern of cut outs that uniquely align with the OCMF that has been assigned to the DMD that is enclosed in the secure case. FIG. 10 has further details regarding the manufacture of the DMD and the secure case in which it is enclosed.

FIG. 10 is a flowchart depicting steps to manufacture a Dedicated Mobile Device (DMD) enclosed in a security enclosure, bind the components, and use the DMD with a critical system. FIG. 10 processing commences at 1000 and shows the steps taken by a manufacturing process that manufactures the DMD and its enclosure. At step 1010, the manufacturing process forms a tamper resistant enclosure with keying ("cut outs") features matching those on the surface of the OCMF to which the enclosure and associated DMD is paired.

At step 1020, the manufacturing process performs a physical isolation of the enclosed DMD provided by the enclosure with access to the DMD's touch screen display and digital camera. Other buttons and WiFi communications are disabled on the DMD. At step 1025, the manufacturing process of the enclosure includes inductive charging station components that are able to charge the enclosed DMD without physically connecting the DMD to a power source. Power is provided to the enclosure and this power provides the inductive charging of the enclosed DMD. At step 1030, the manufacturing process generates a pair of crypto keys (Public key-private key) and these keys are stored on secure storage of the DMD with the DMD's private key being made inaccessible to processes outside of the DMD.

At step 1040, the manufacturing process retrieves unique identifiers corresponding to the DMD, OCMF, and SACA. These UIDs are signed by the manufacturer certificate authority (CA) and stored in the DMD secure storage. At step 1050, the manufacturing process retrieves public key of both the OCMF assigned to the DMD and the public key of the SACA device assigned to the DMD. The public keys are signed by the manufacturer and stored in secure storage of the DMD.

At step 1060, the manufacturing process configures the DMD for restricted communication to pre-defined cellular and optical entities and inhibits wireless communications (WiFi) with the DMD. This configuration allows the DMD to read text displayed on the SACA's display screen using the DMD's digital camera and likewise allows the DMD to display information on its display screen that can be read by the SACA's digital camera.

At step 1070, the manufacturing process configures the DMD for end user operation of a limited number of applications. In one embodiment, the operation is limited to a single application that is used to receive and display secure optical data communications with the dedicated SACA device. At step 1075, the manufacturing process configures the DMD for limited I/O through touch screen, display, and camera only with limited cellular communications to dedicated pre-set telephone number(s). Other types of communication, such as WiFi, are inhibited.

Figure 11:
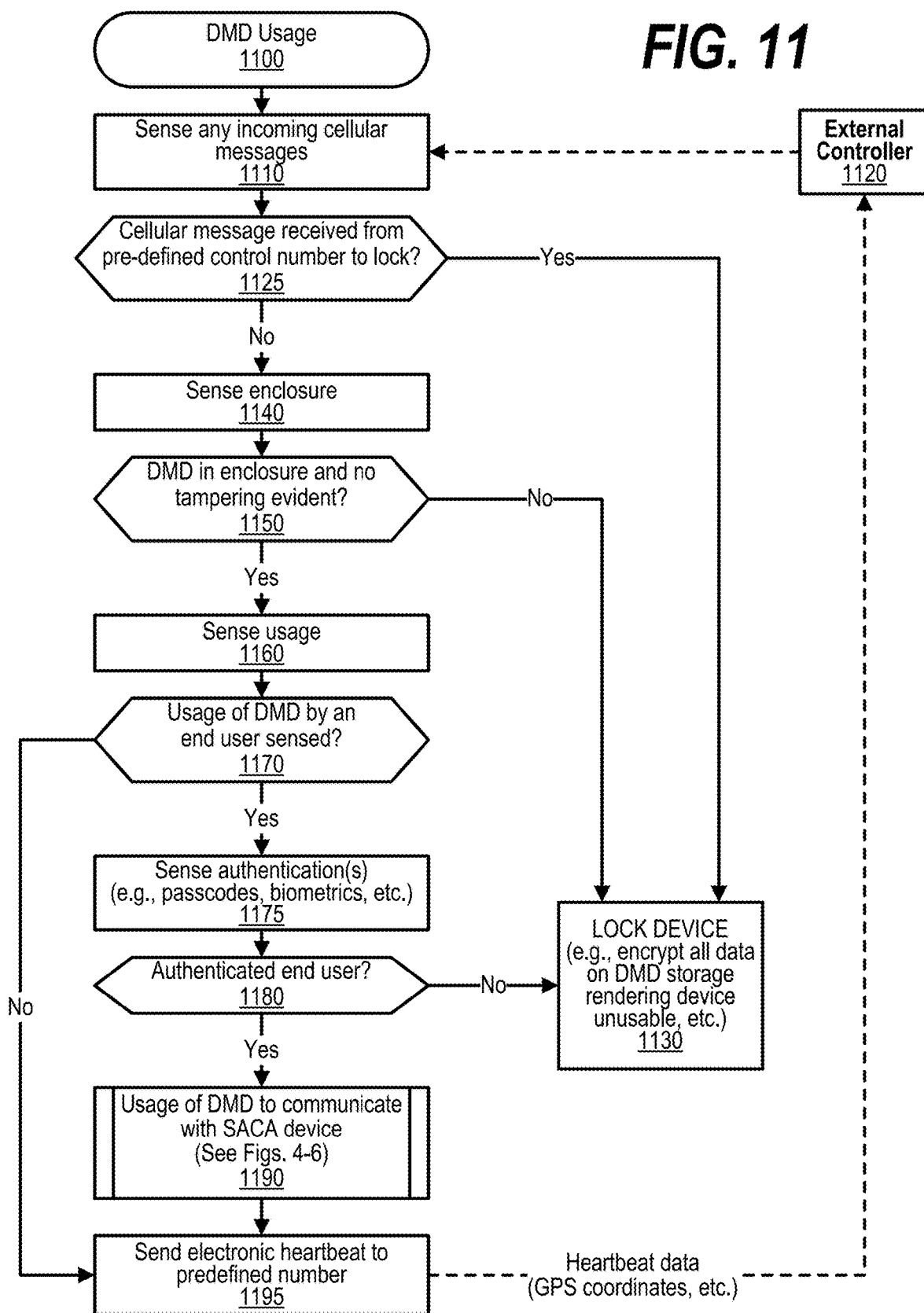
FIG. 11 is a component diagram depicting usage of a Dedicated Mobile Device (DMD).

At step 1080, the manufacturing process configures the DMD to continuously check for removal from the enclosure. In one embodiment, if removal of the DMD is sensed, then the DMD is programmed to lock down storage by encrypting storage with an encryption code rendering the DMD unusable. At step 1090, the manufacturing process configures the DMD to always be in a powered on state and transmits a GPS heartbeat to predetermined cellular number. The GPS heartbeat indicates that the DMD is operational and further provides a current GPS location of the DMD. In this embodiment, the GPS device included in the DMD is activated with communications being allowed between the DMD and the GPS. At step 1095, the manufacturing process configures the DMD to default to a power save mode during times of non-use of the DMD device. FIG. 11 shows usage of the DMD enclosed in the secure enclosure after the manufacturing process has concluded.

FIG. 11 is a component diagram depicting usage of a Dedicated Mobile Device (DMD). FIG. 11 processing commences at 1100 and shows the steps taken during usage of a dedicated mobile device (DMD). At step 1110, the DMD process senses any incoming cellular messages from external controller 1120. In one embodiment, incoming messages are only allowed from a set of one or more predefined numbers limiting exposure of the device from non-trusted numbers.

The DMD process determines whether a cellular message was received from a pre-defined control number with instructions to lock the DMD device (decision 1125). Such a lock command might be sent if the DMD device is lost, stolen, or otherwise compromised. If a cellular message to lock the device is received from a pre-defined control, then decision 1125 branches to the 'yes' branch which branches to "lock" step 1130. On the other hand, if such a lock instruction was not received, then decision 1125 branches to the 'no' branch for further processing. If a lock instruction was received then, at step 1130, the process locks the DMD device. For example, the device might encrypt all data stored on the DMD's storage rendering the device unusable, permanently powered off, or the like, to prevent unauthorized users from using the DMD.

If a lock instruction was not received then, at step 1140, the process senses whether the DMD is properly secured in the enclosure. The process determines whether the DMD is properly secured in the enclosure and that no tampering is evident on the enclosure or the DMD (decision 1150). If the DMD is in the enclosure and no tampering is evident, then decision 1150 branches to the 'yes' branch for further processing. On the other hand, if the DMD is not properly secured in the enclosure or tampering is evident, then decision 1150 branches to the 'no' branch which performs the "lock" device operation at step 1130.

If the DMD is properly secured in the enclosure and tampering is not evident then, at step 1160, the process senses usage of the device by a user. The process determines whether usage of the DMD is detected by an end user (decision 1170). If usage of the DMD by an end user is detected, then decision 1170 branches to the 'yes' branch for further processing of steps 1175 through 1190. On the other hand, if usage of the DMD by an end user is not sensed, then decision 1170 branches to the 'no' branch bypassing steps 1175 through 1190.

If usage of the DMD is detected, then steps 1175 through 1190 are performed. At step 1175, the process senses authentication of the device by the end user. Authentication can include biometrics (e.g., fingerprint, iris scan, etc.) of the end user, validation of a user identifier and password, or any other authentication processes utilized. The process determines whether the end user has been authenticated (decision 1180). If the end user is authenticated, then decision 1180 branches to the 'yes' branch to perform predefined process 1190. On the other hand, if the end user is not authenticated, perhaps indicating that the DMD has been obtained by a non-authorized user, then decision 1180 branches to the 'no' branch whereupon the "lock" device process is performed at step 1130 to protect the DMD from unauthorized use. When the user is authenticated then, at predefined process 1190, the process performs the routines described in FIGS. 4 through 6 (see these Figures and corresponding text for processing details).

At step 1195, the process sends electronic heartbeat to predefined number with the heartbeat being a message that is sent over a cellular network to a predefined number of the external controller. In one embodiment, this electronic heartbeat includes a current GPS location of the DMD so that external controller can send a "lock device" instruction if the GPS location of the device is found to be outside a permitted geographic area, perhaps indicating that the device has been stolen.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium is a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, does not include, and is not to be construed as being, transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
   optically transmitting a first set of data from a dedicated mobile device (DMD) to another device, wherein the optically transmitting comprises displaying the first set of data on a display screen included in the DMD;
   optically receiving a second set of data at the DMD, wherein the second set of data is received at a digital camera included in the DMD;
   verifying, based on the first and second sets of data, that the other device and the DMD are bound to each other,
   periodically transmitting data pertaining to an electronic heartbeat to one of a set of one or more telephone numbers, wherein the data includes a set of global positioning data pertaining to the DMD;
   receiving instructional data from one of the set of telephone numbers responsive to the periodic transmissions; and
   inhibiting use of the DMD in response to one of the instructional data when a possible threat to the DMD has been detected.

2. The method of claim 1 further comprising:
   detecting whether the DMD is secured within a secure enclosure;
   in response to determining that the DMD is secured in the secure enclosure, allowing the optical transmission of the first data set and the receiving of the second data; and
   in response to determining that the DMD is unsecured, inhibiting usage of the DMD.

3. The method of claim 2 wherein the secure enclosure inhibits use of cable connections to the DMD, and wherein the secure enclosure includes an inductive charger to charge a battery that powers the DMD.

4. The method of claim 1 wherein the DMD is isolated, the isolation steps comprising:
   inhibiting wireless networking from the DMD to the set of one or more telephone numbers;
   storing the set of telephone numbers in a nonvolatile storage of the DMD; and
   inhibiting editing of the set of telephone numbers by an end user.

5. The method of claim 4 further comprising:
   inhibiting use of inputs to the DMD to a touch-enabled display screen of the DMD and the digital camera of the DMD.

6. The method of claim 5 further comprising:
   limiting usage of the DMD by an end user to a limited set of one or more applications pre-installed on the DMD; and
   inhibiting modification, by the end user, of the set of applications pre-installed on the DMD.

7. An information handling system that is a dedicated mobile device (DMD), the information handling system comprising:
   one or more processors;
   a display screen accessible by at least one of the processors;
   a digital camera accessible by at least one of the processors;
   a memory coupled to at least one of the processors; and
   a set of computer program instructions stored in the memory and executed by at least one of the processors in order to perform actions comprising:
      optically transmitting a first set of data from the DMD to another device, wherein the optically transmitting comprises displaying the first set of data on the DMD's display screen;
      optically receiving a second set of data at the DMD, wherein the second set of data is received at the DMD's digital camera;
      verifying, based on the first and second sets of data, that the other device and the DMD are bound to each other;
      periodically transmitting data pertaining to an electronic heartbeat to one of a set of one or more telephone numbers, wherein the data includes a set of global positioning data pertaining to the DMD;
      receiving instructional data from one of the set of telephone numbers responsive to the periodic transmissions; and
      inhibiting use of the DMD in response to one of the instructional data when a possible threat to the DMD has been detected.

8. The information handling system of claim 7 wherein the actions further comprise:
   detecting whether the DMD is secured within a secure enclosure;

in response to determining that the DMD is secured in the secure enclosure, allowing the optical transmission of the first data set and the receiving of the second data; and in response to determining that the DMD is unsecured, inhibiting usage of the DMD.

9. The information handling system of claim 8 wherein the secure enclosure inhibits use of cable connections to the DMD, and wherein the secure enclosure includes an inductive charger to charge a battery that powers the DMD.

10. The information handling system of claim 7 wherein the DMD is isolated, the isolation steps comprising:
inhibiting wireless networking from the DMD to the set of one or more telephone numbers;
storing the set of telephone numbers in a nonvolatile storage of the DMD; and
inhibiting editing of the set of telephone numbers by an end user.

11. The information handling system of claim 10 wherein the actions further comprise:
inhibiting use of inputs to the DMD to a touch-enabled display screen of the DMD and the digital camera of the DMD.

12. The information handling system of claim 11 wherein the actions further comprise:
limiting usage of the DMD by an end user to a limited set of one or more applications pre-installed on the DMD; and
inhibiting modification, by the end user, of the set of applications pre-installed on the DMD.

13. A computer program product stored in a computer readable storage medium, comprising computer program code that, when executed by an information handling system, performs actions comprising:
optically transmitting a first set of data from a dedicated mobile device (DMD) to another device, wherein the optically transmitting comprises displaying the first set of data on a display screen included in the DMD;
optically receiving a second set of data at the DMD, wherein the second set of data is received at a digital camera included in the DMD;
verifying, based on the first and second sets of data, that the other device and the DMD are bound to each other;
periodically transmitting data pertaining to an electronic heartbeat to one of a set of one or more telephone numbers, wherein the data includes a set of global positioning data pertaining to the DMD;
receiving instructional data from one of the set of telephone numbers responsive to the periodic transmissions; and
inhibiting use of the DMD in response to one of the instructional data when a possible threat to the DMD has been detected.

14. The computer program product of claim 13 wherein the actions further comprise:
detecting whether the DMD is secured within a secure enclosure, wherein the secure enclosure inhibits use of cable connections to the DMD, and wherein the secure enclosure includes an inductive charger to charge a battery that powers the DMD;
in response to determining that the DMD is secured in the secure enclosure, allowing the optical transmission of the first data set and the receiving of the second data; and
in response to determining that the DMD is unsecured, inhibiting usage of the DMD.

15. The computer program product of claim 13 wherein the DMD is isolated, the isolation steps comprising:
inhibiting wireless networking from the DMD to the set of one or more telephone numbers;
storing the set of telephone numbers in a nonvolatile storage of the DMD; and
inhibiting editing of the set of telephone numbers by an end user.

16. The computer program product of claim 15 wherein the actions further comprise:
inhibiting use of inputs to the DMD to a touch-enabled display screen of the DMD and the digital camera of the DMD.

17. The computer program product of claim 15 wherein the actions further comprise:
limiting usage of the DMD by an end user to a limited set of one or more applications pre-installed on the DMD; and
inhibiting modification, by the end user, of the set of applications pre-installed on the DMD.

* * * * *